US008255457B2

(12) United States Patent
Turner et al.

(10) Patent No.: US 8,255,457 B2
(45) Date of Patent: Aug. 28, 2012

(54) ADAPTIVE CONTENT LOAD BALANCING

(75) Inventors: Derek Turner, Redmond, WA (US); Yogananda Rao, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 315 days.

(21) Appl. No.: 11/469,812

(22) Filed: Sep. 1, 2006

(65) Prior Publication Data

US 2008/0059565 A1   Mar. 6, 2008

(51) Int. Cl.
 G06F 15/16 (2006.01)
 H04N 7/173 (2011.01)
(52) U.S. Cl. ........ 709/203; 709/227; 709/228; 709/229; 725/87
(58) Field of Classification Search .................. 709/203, 709/227–229; 725/87
 See application file for complete search history.

(56) References Cited

U.S. PATENT DOCUMENTS

| | | | |
|---|---|---|---|
| 5,802,292 A | 9/1998 | Mogul | |
| 6,085,193 A | 7/2000 | Malkin et al. | |
| 6,128,701 A | 10/2000 | Malcolm et al. | |
| 6,330,609 B1 * | 12/2001 | Garofalakis et al. | 709/229 |
| 6,449,696 B2 | 9/2002 | Okayasu | |
| 6,542,964 B1 * | 4/2003 | Scharber | 711/122 |
| 6,606,619 B2 * | 8/2003 | Ortega et al. | 707/2 |
| 6,766,422 B2 | 7/2004 | Beyda | |
| 6,865,605 B1 * | 3/2005 | Soderberg et al. | 709/226 |
| 6,898,783 B1 * | 5/2005 | Gupta et al. | 717/105 |
| 6,912,534 B2 | 6/2005 | DeBettencourt et al. | |
| 6,925,499 B1 * | 8/2005 | Chen et al. | 709/226 |
| 6,950,822 B1 * | 9/2005 | Idicula et al. | 707/10 |
| 6,973,536 B1 | 12/2005 | Jacobs et al. | |
| 6,988,096 B2 | 1/2006 | Gupta et al. | |
| 6,990,526 B1 | 1/2006 | Zhu | |
| 7,039,784 B1 * | 5/2006 | Chen et al. | 711/170 |
| 7,062,556 B1 * | 6/2006 | Chen et al. | 709/226 |
| 7,483,943 B2 * | 1/2009 | Kakivaya et al. | 709/203 |
| 8,001,217 B1 * | 8/2011 | Pan et al. | 709/219 |
| 2002/0049977 A1 * | 4/2002 | Miller et al. | 725/82 |
| 2002/0087797 A1 * | 7/2002 | Adrangi | 711/133 |
| 2002/0133566 A1 | 9/2002 | Teeple | |
| 2004/0088412 A1 * | 5/2004 | John et al. | 709/226 |
| 2004/0128618 A1 | 7/2004 | Datta | |
| 2005/0033858 A1 | 2/2005 | Swildens et al. | |
| 2005/0060497 A1 * | 3/2005 | Krissell et al. | 711/133 |
| 2005/0076099 A1 * | 4/2005 | Wang et al. | 709/219 |
| 2005/0091388 A1 * | 4/2005 | Kamboh et al. | 709/228 |
| 2005/0262245 A1 | 11/2005 | Menon et al. | |
| 2005/0262246 A1 * | 11/2005 | Menon et al. | 709/226 |
| 2006/0015574 A1 * | 1/2006 | Seed et al. | 709/219 |

(Continued)

OTHER PUBLICATIONS

Little, T.D.C, Venkatesh, D., "Popularity-based assignment of movies to storage devices in a video-on-demand system", 1995, Multimedi System Springer-Verlag, 2, 208-287.*

(Continued)

Primary Examiner — Kenny Lin
Assistant Examiner — Guang Li
(74) Attorney, Agent, or Firm — Wolfe-SBMC

(57) ABSTRACT

Adaptive content load balancing is described. In an embodiment, client requests for media content are received and service node(s) are determined that can provide the requested media content to a client. Each client request is registered to correlate client sessions with requested media content provided from a service node, and a determination is made as to whether to replicate the requested media content for each received client request to optimize session capacity over the service node(s).

20 Claims, 5 Drawing Sheets

U.S. PATENT DOCUMENTS

| | | | |
|---|---|---|---|
| 2007/0076728 A1* | 4/2007 | Rieger et al. | 370/401 |
| 2007/0124476 A1* | 5/2007 | Oesterreicher et al. | 709/226 |
| 2008/0059631 A1* | 3/2008 | Bergstrom et al. | 709/224 |
| 2008/0059721 A1 | 3/2008 | Turner | |

OTHER PUBLICATIONS

Davison, "Predicting Web Actions from HTML Content", HT '02, Jun. 11-15, 2002, available at <<http://delivery.acm.org/10.1145/520000/513380/p159-davison.pdf?key1=513380&key2=2188245411&coll=GUIDE&dl=GUIDE&CFID=69720934&CFTOKEN=18448148>>, pp. 159-168.

Gadde, et al., "Web Caching and Content Distribution: A View from the Interior", available at >>http://www.cs.duke.edu/ari/cisi/crisp/wwwc2000revised.ps.gz>>, 13 pages.

Lempel, et al., "Predictive Caching and Prefetching of Query Results in Search Engines", WWW 2003, May 20-24, 2003, available at <<http://www.cs.technion.ac.il/~moran/r/PS/www12.pdf>>, 10 pages.

"Final Office Action", U.S. Appl. No. 11/469,784, (Sep. 10, 2009),13 pages.

"Final Office Action", U.S. Appl. No. 11/469,784, (Jan. 7, 2011),13 pages.

"Non-Final Office Action", U.S. Appl. No. 11/469,784, (Jan. 30, 2009),16 pages.

"Non-Final Office Action", U.S. Appl. No. 11/469,784, (Sep. 14, 2010),12 pages.

* cited by examiner

ADAPTIVE CONTENT LOAD BALANCING

BACKGROUND

Television viewing is increasingly on-demand to deliver requested media content to viewers. On-demand media content can include any type of recorded media, such as television programs, on-demand videos, and pay-per-view movies, any of which viewers can request for viewing when convenient rather than at a scheduled broadcast time. As on-demand media content is requested more often and by an increasing number of viewers, content providers face an increasing need to provide adequate session capacity to timely deliver the requested media content with a high quality of service.

The popularity of various media content assets is transitory and difficult to ascertain for a content provider attempting to determine how many copies of an asset should be maintained to serve multiple requests for the asset. For a newly introduced media content asset, the popularity of the asset can increase rapidly at first and then slowly decline over time. This is indicative of a scenario where a new summer movie is made available to order through on-demand and a large number of subscribers request the media content asset for viewing.

As a content provider, it is very difficult to predict which programs are going to be popular and when. New movies, a series of television programs, a documentary, and the like can quickly rise in popularity and overwhelm an on-demand content delivery system when session capacity is inadequate. In addition, events can occur that quickly change viewer requests, such as the death of a well-known movie star that incites viewers to become suddenly interested in past movies and television programs that the movie star appeared in. Determining which media content assets to replicate for session capacity is typically a real-time decision based on the assets that are currently requested, but does not account for changing circumstances and the transitory popularity of different media content assets.

SUMMARY

This summary is provided to introduce simplified concepts of adaptive content load balancing which is further described below in the Detailed Description. This summary is not intended to identify essential features of the claimed subject matter, nor is it intended for use in determining the scope of the claimed subject matter.

In an embodiment of adaptive content load balancing, client requests for media content are received and service node(s) are determined that can provide the requested media content to a client. Each client request is registered to correlate client sessions with requested media content provided from a service node, and a determination is made as to whether to replicate the requested media content for each received client request to optimize session capacity over the service node(s).

BRIEF DESCRIPTION OF THE DRAWINGS

The same numbers are used throughout the drawings to reference like features and components.

DETAILED DESCRIPTION

Adaptive content load balancing and predictive popular content replication together provide both real-time and proactive load balancing, as well as media content popularity forecasting with replication assessments to optimize session capacity over one or more service node(s) in a media content delivery system. Adaptive content load balancing is described in which embodiments provide that when client requests for media content are received, a determination is made as to whether to replicate the requested media content for each received client request to optimize session capacity over the service node(s) that provide the requested media content. A load balancing service can balance the client sessions correlated with the requested media content by determining whether to replicate the requested media content based on a capacity threshold of the service node(s).

Predictive popular content replication is described in which embodiments provide that the future utilization of media content assets can be forecast based on historical consumption data. Previous requests for the media content can be trended to forecast its popularity prior to receiving additional requests for the media content. Based on these forecasts, the assets that are expected to be heavily requested can be replicated by the service node(s) and/or into cache memory so that the media content assets can be readily accessed when requested. This predictive technique is not just based on real-time decisions, but dynamically expands the availability of the more popular media content to accommodate session capacity given the popularity of the media content and concurrent sessions of the media content. The decision can be made as what to pre-populate into disk-based memory and/or cache memory while throughput is available rather than waiting for the system to become overloaded with client media content asset requests.

While aspects of the described systems and methods for adaptive content load balancing and predictive popular content replication can be implemented in any number of different computing systems, environments, television-based entertainment systems, and/or configurations, embodiments of adaptive content load balancing and predictive popular content replication are described in the context of the following example systems and environments.

Figure 1:
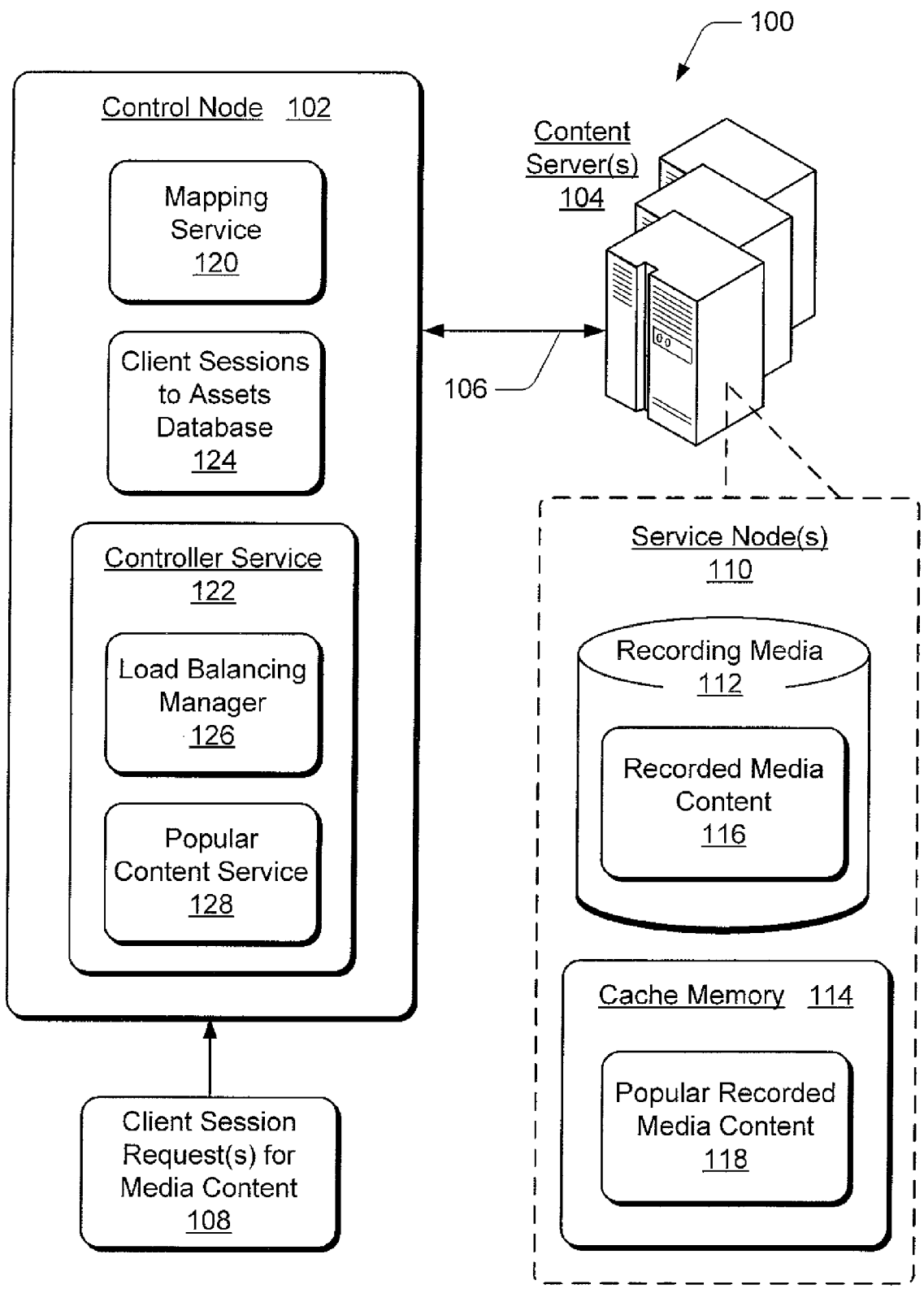
FIG. 1 illustrates an example media content system in which embodiments of adaptive content load balancing and predictive popular content replication can be implemented.

FIG. 1 illustrates an example media content system 100 in which embodiments of adaptive content load balancing and predictive popular content replication can be implemented. The media content system 100 includes a control node 102 and one or more content servers 104 which are controlled via communication 106 by the control node 102. The control node 102 can receive client session requests 108 for media content (also referred to herein as an "asset" or "assets") which is then provided by a content server 104 to a requesting client device. Each content server 104 can include one or more service nodes 110 where a service node provides requested media content as a service, independent of whether it is embodied as content server or as multiple service nodes within a content server.

Any of the service nodes 110 can include a recording media 112, such as a disk-based media, and/or can include cache memory 114. In a media content system, the recording media 112 is a disk-based media that is relatively slow to access and deliver media content, but has a large amount of capacity to maintain media content that may be requested. Alternatively, the cache memory 114 can be a relatively high-speed, solid-state memory having a finite amount of storage capacity. In this example, recorded media content 116 is maintained with the recording media 112, and popular recorded media content 118 is maintained in the cache memory 114. Recorded media content 116, 118 can include television-based programs (or programming), time-shifted live broadcasts, video on-demand programs, pay-per-view movies, interactive games, network-based applications, and any other audio, video, and/or image content received or provided from any type of media content source via an on-demand content delivery system.

The control node 102 includes a mapping service 120, a controller service 122, and a database 124 to correlate client sessions with assets provided from the service node(s) 110. Optionally, the controller service 122 includes a load balancing manager 126 to implement embodiments of adaptive content load balancing and a popular content service 128 to implement embodiments of predictive popular content replication. The mapping service 120 and the controller service 122 (to include the load balancing manager 126 and the popular content service 128) can each be implemented as computer executable instructions and executed by one or more processors to implement embodiments of adaptive content load balancing and/or predictive popular content replication. A service, such as the mapping service 120 and the controller service 122, can be implemented as resident programmed applications that run under a service construct as a process. Additionally, the control node 102, content server(s) 104, and/or the service node(s) 110 may be implemented with any number and combination of differing components as further described below with reference to the example service node shown in FIG. 2.

Although the mapping service 120 and the controller service 122 are each illustrated and described as single application programs, each of the mapping service 120 and the controller service 122 can be implemented as several component applications distributed to each perform one or more functions in a media content system. Further, although the mapping service 120 and the controller service 122 are illustrated and described as separate application programs, the mapping service 120 and the controller service 122 can be implemented together as a single application program.

For adaptive content load balancing, the media content system 100 is an on-demand media content delivery system to provide media content when requested by a client. The mapping service 120 receives the client session requests 108 for media content and determines which of the service node(s) 110 can provide the requested media content to a client. The mapping service 120 also registers each client request in the database 124 to correlate client sessions with requested media content provided from a service node 110.

When a client request 108 for a media content asset is received, the mapping service 120 determines from the database 124 which of the service node(s) 110 have the requested asset, and can return an indication of which service node(s) 110 have the asset with the least capacity or utilization. The mapping service 120 can send a message via communication 106 to a content server 104 requesting a service node 110 for a client session. The content server 104 can then return a request acknowledgement with an indication of which service node(s) 110 can provide the requested media content to the client. The mapping service 120 can then determine which is the best service node 110 to apply the client session request 108, and then passes off the request to the controller service 122 for adaptive content load balancing. If there is not adequate session capacity to service the client session, then the controller service 122 can direct that an additional service node replicate the requested media content.

The controller service 122 (to include the load balancing manager 126) can determine whether to replicate the requested media content for each received client request to optimize session capacity over the service node(s) 110. The controller service 122 can determine a top number of assets by per-node session count and store the optimization information in the database 124, such as the number of sessions per asset, a time and date, and a number of the service nodes that currently maintain the asset.

The controller service 122 can balance the client sessions correlated with the media content by determining whether to replicate the requested media content based on a capacity threshold of the service node(s) 110. Additionally, the controller service 122 can initiate replication of the requested media content such that a client session can be established to provide the requested media content to a client. The media content can be replicated when the requested media content is provided for the most client sessions, provided for fewer client sessions than additional media content provided for the most client sessions, or provided for the fewest client sessions. Each session request is evaluated based on session balance of the service node(s) 110, and an asset that is not the most popular, or even the least popular, can be replicated to another service node to optimize session capacity over the service node(s) 110.

For predictive popular content replication, the controller service 122 (to include the popular content service 128) can trend previous requests for particular media content to forecast its popularity prior to receiving additional requests for the media content, and initiate replication of the media content such that the media content can be rapidly accessed to serve the additional client requests. The controller service 122 can trend the previous requests for the media content over more than one day (i.e., for several days) to forecast a popularity increase in the media content or a popularity decrease in the media content. This is predictive popularity based on past reference.

In addition, the controller service 122 can trend the previous requests for the media content at a same time period of each day to determine when to initiate replication of the media content during the day. For example, if a trend indicates that an asset was within the top twenty requested assets forty-eight hours previous, but does not show up in the top twenty requested assets twenty-four hours previous, it can be determined that the popularity of the asset is decreasing. However, if the trend indicates that the asset was not within the top twenty requested assets seventy-two hours previous, but is within the top twenty requested assets forty-eight hours previous, then it can be determined that the popularity of the asset is increasing. The popularity of an asset as determined over days and/or hours can also be weighted, such as where past days are weighted less than a current day when forecasting popularity of the media content.

In addition, each hour of the day can have a different category of popular media content. For example, children's shows and cartoons will likely be in higher demand during the morning hours, while more adult-centric programming, movies, and the like will be in higher demand during the evening hours. As such, the forecasted popularity of various media content can be based on any one or combination of a number of current client sessions for the media content, a category of the media content, and a time period of a day when the additional requests for the media content are forecast to be received.

The forecasts of the popular media content takes into account asset popularity during different time segments, such that caching the popular media content corresponds to the different days and times of a day when the media content is more likely to be requested. Based on the forecasts of media content popularity, the controller service 122 can initiate replication of the assets that are expected to be heavily requested into cache memory 114 so that the assets (e.g., popular recorded media content 118) can be readily accessed when requested.

This predictive technique is not just based on real-time decisions, but dynamically expands the availability of the more popular media content to accommodate session capacity given the popularity of the content and concurrent sessions of the content. The decision can be made as to what to pre-populate in disk-based memory and/or cache memory while throughput is available rather than waiting for the system to become overloaded with client media content asset requests.

The controller service 122 can determine whether media content is forecast to be more popular than the least popular media content 118 maintained in the cache memory 114. The controller service 122 can then initiate the replication of the media content into cache memory 114 in an event that the media content is forecast as more popular than the least popular media content. The media content can be accessed faster than from the disk-based recording media 112 to serve the requests for the media content. To initiate the replication of the media content to the one or more service node(s) 110, the controller service 122 can increase the number of client sessions for the media content in the database 124. This triggers the load balancing manager 126 to initiate replicating the determined popular media content to optimize and balance the forecasted client sessions across the service node(s) 110.

Figure 2:
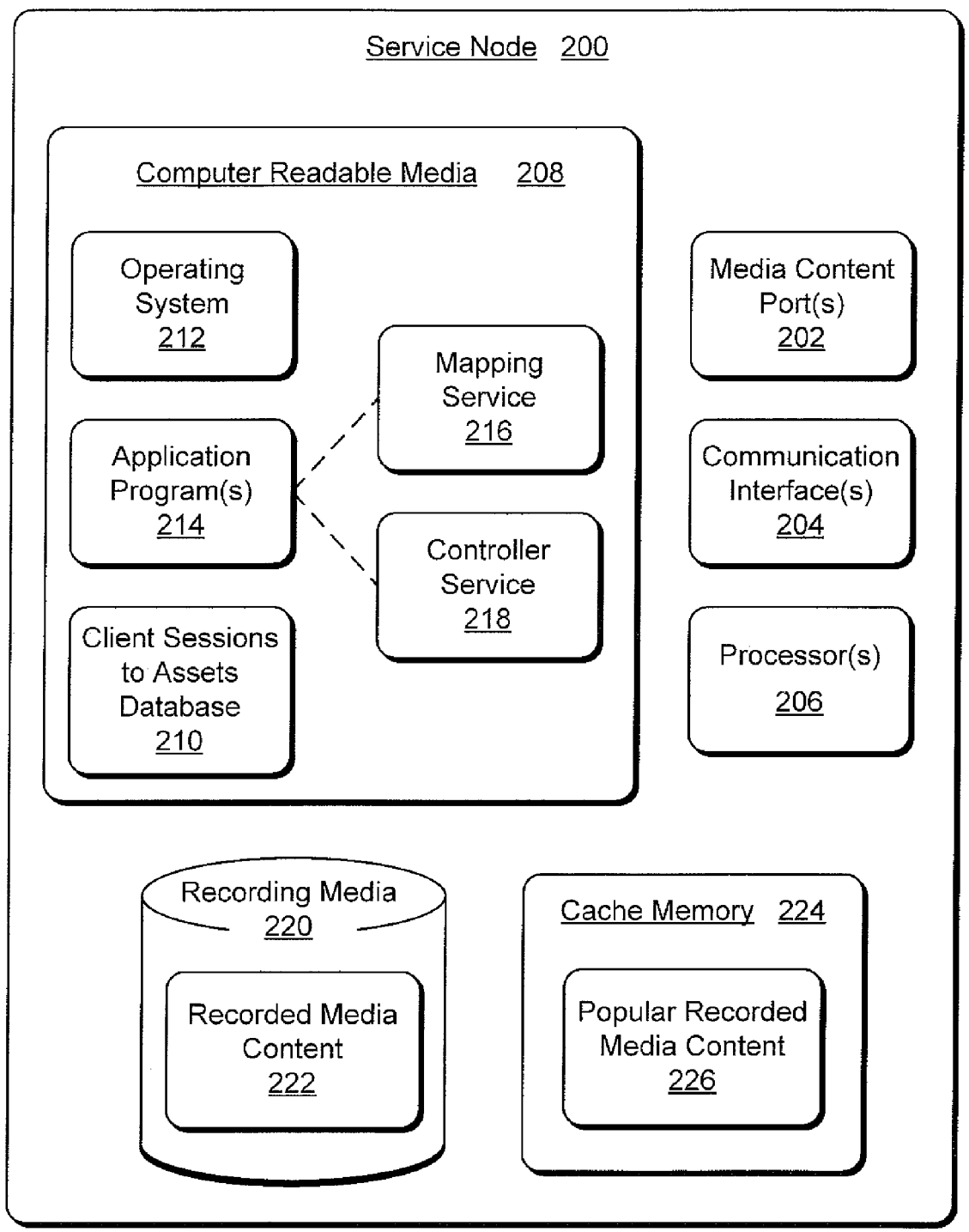
FIG. 2 illustrates an example service node in the media content system in which embodiments of adaptive content load balancing and predictive popular content replication can be implemented.

FIG. 2 illustrates an example service node 200, such as in the media content system 100 shown in FIG. 1. The service node 200 can be implemented as any form of computing-based and/or electronic device in which embodiments of adaptive content load balancing and/or embodiments of predictive popular content replication can be implemented.

In this example, the service node 200 includes one or more media content ports 202 which may include Internet Protocol (IP) inputs over which streams of media content are provided to a requesting client via an IP-based network. Service node 200 further includes communication interface(s) 204 which can be implemented as any one or more of a serial and/or parallel interface, a wireless interface, any type of network interface, a modem, and as any other type of communication interface.

A network interface provides a connection between the service node 200 and a communication network by which other electronic and computing devices can communicate data with the service node 200, such as the control node 102. Similarly, a serial and/or parallel interface provides for data communication directly between service node 200 and the other electronic or computing devices. A modem facilitates service node 200 communication with other electronic and computing devices via a conventional telephone line, a DSL connection, cable, and/or other type of connection.

Service node 200 also includes one or more processors 206 (e.g. any of microprocessors, controllers, and the like) which process various computer executable instructions to control the operation of service node 200, to communicate with other electronic and computing devices, and to implement embodiments of adaptive content load balancing and predictive popular content replication. Service node 200 can be implemented with computer readable media 208, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 208 provides data storage mechanisms to provide data storage for a client sessions to assets database 210, and to store various information and/or data such as software applications and any other types of information and data related to operational aspects of service node 200. An operating system 212 and other application programs 214 can be maintained as software applications with the computer readable media 208 and executed on processor(s) 206 to implement embodiments of adaptive content load balancing and predictive popular content replication. For example, service node 200 can be implemented to include a mapping service 216 and a controller service 218 that are implemented as described with reference to the similar components shown in FIG. 1. The service node 200 also includes recording media 220, such as a disk-based media to maintain recorded media content 222, and/or can include cache memory 224 to maintain popular recorded media content 226.

Generally, any of the functions and methods described herein can be implemented using hardware, software, firmware (e.g., fixed logic circuitry), manual processing, or any combination thereof. A software implementation represents program code that performs specified tasks when executed on a computing-based processor. Example methods 300 and 400 described with reference to respective FIGS. 3-4 may be described in the general context of computer executable instructions. Generally, computer executable instructions can include applications, routines, programs, objects, components, data structures, procedures, modules, functions, services, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices. Further, the features described herein are platform-independent such that the techniques may be implemented on a variety of computing platforms having a variety of processors.

Figure 3:
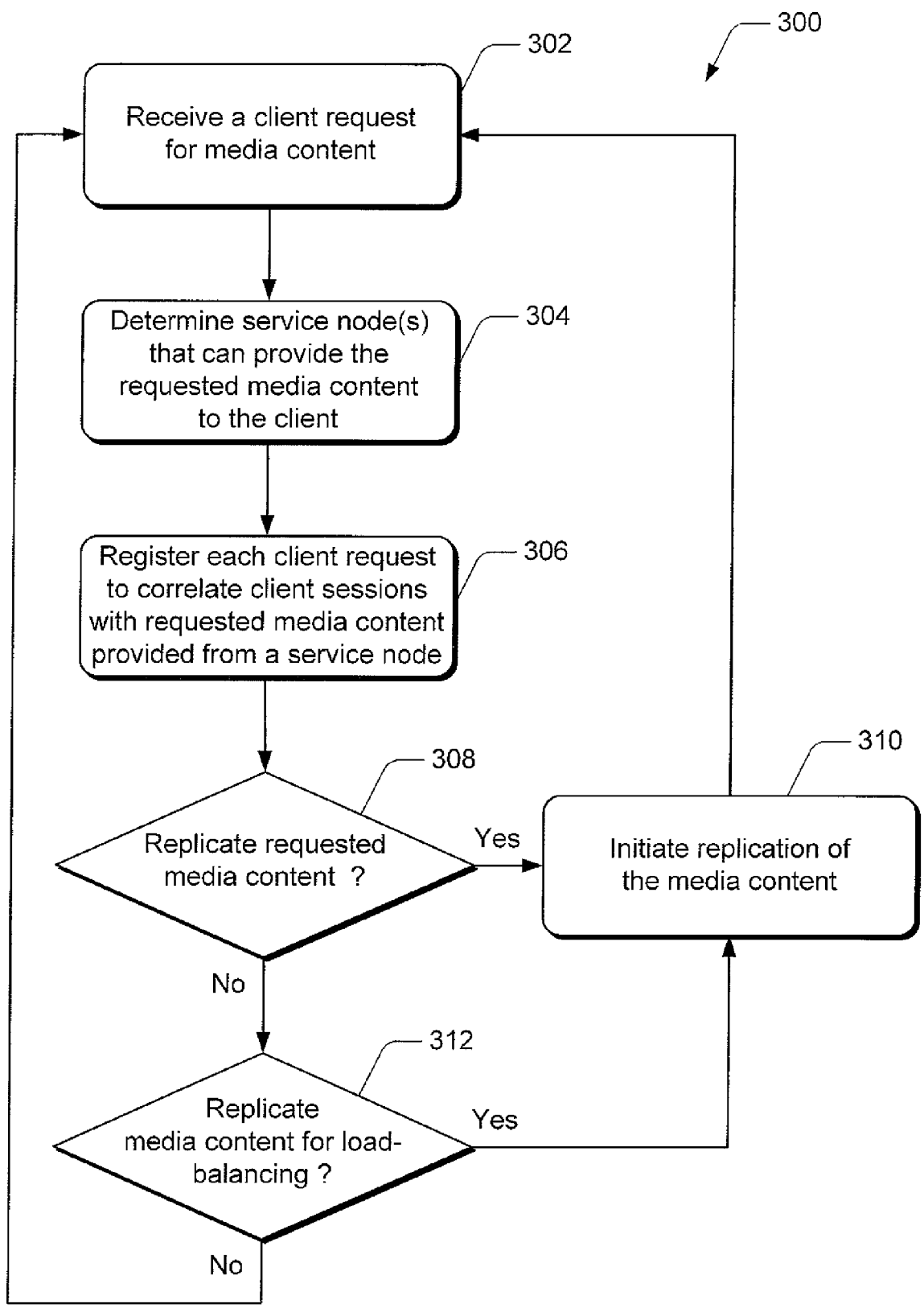
FIG. 3 illustrates example method(s) for adaptive content load balancing.

FIG. 3 illustrates an example method 300 for adaptive content load balancing and is described with reference to the example media content systems shown in FIGS. 1 and 2. The order in which the method is described is not intended to be construed as a limitation, and any number of the described method blocks can be combined in any order to implement the method, or an alternate method.

At block 302, client requests for media content are received and, at block 304, service node(s) that can provide the requested media content to a client are determined. For example, the control node 102 receives client session requests 108 for media content which is then provided by a content server 104 to a requesting client device. The mapping service 120 receives the client session requests 108 for media content and determines which of the service node(s) 110 can provide the requested media content to a client.

At block 306, each client request is registered to correlate client sessions with requested media content provided from a service node. For example, the mapping service 120 also registers each client request in the database 124 to correlate client sessions with requested media content provided from a service node 110.

At block 308, a determination is made as to whether to replicate the requested media content for each received client request to optimize session capacity over the one or more service nodes. The client sessions correlated with the requested media content can be balanced to optimize the session capacity over the one or more service nodes. For example, the controller service 122 (to include the load balancing manager 126) can determine whether to replicate the requested media content for each received client request to optimize session capacity over the service node(s) 110.

If the requested media content is to be replicated (i.e., "yes" from block 308), then replication of the requested media content is initiated at block 310 such that a client session can be established to provide the requested media content to the client. An additional service node can be directed to replicate the requested media content such that the client session can be established with the additional service node. The replication of the requested media content can be initiated when the requested media content is provided for the most client sessions, provided for fewer client sessions than additional media content provided for the most client sessions, or provided for the fewest client sessions.

If the requested media content is not to be replicated (i.e., "no" from block 308), then a determination is made at block 312 as to whether the media content maintained with the one or more service nodes is to be replicated for load-balancing. If the media content is to be replicated for load-balancing (i.e., "yes" from block 312), then replication of the media content is initiated at block 310. The determination to replicate for load-balancing can be based in part on a capacity threshold of the one or more service node(s) 110. If the media content is not to be replicated for load-balancing (i.e., "no" from block 312), and from block 310, the method 300 continues at block 302 to receive an additional client request for media content.

Figure 4:
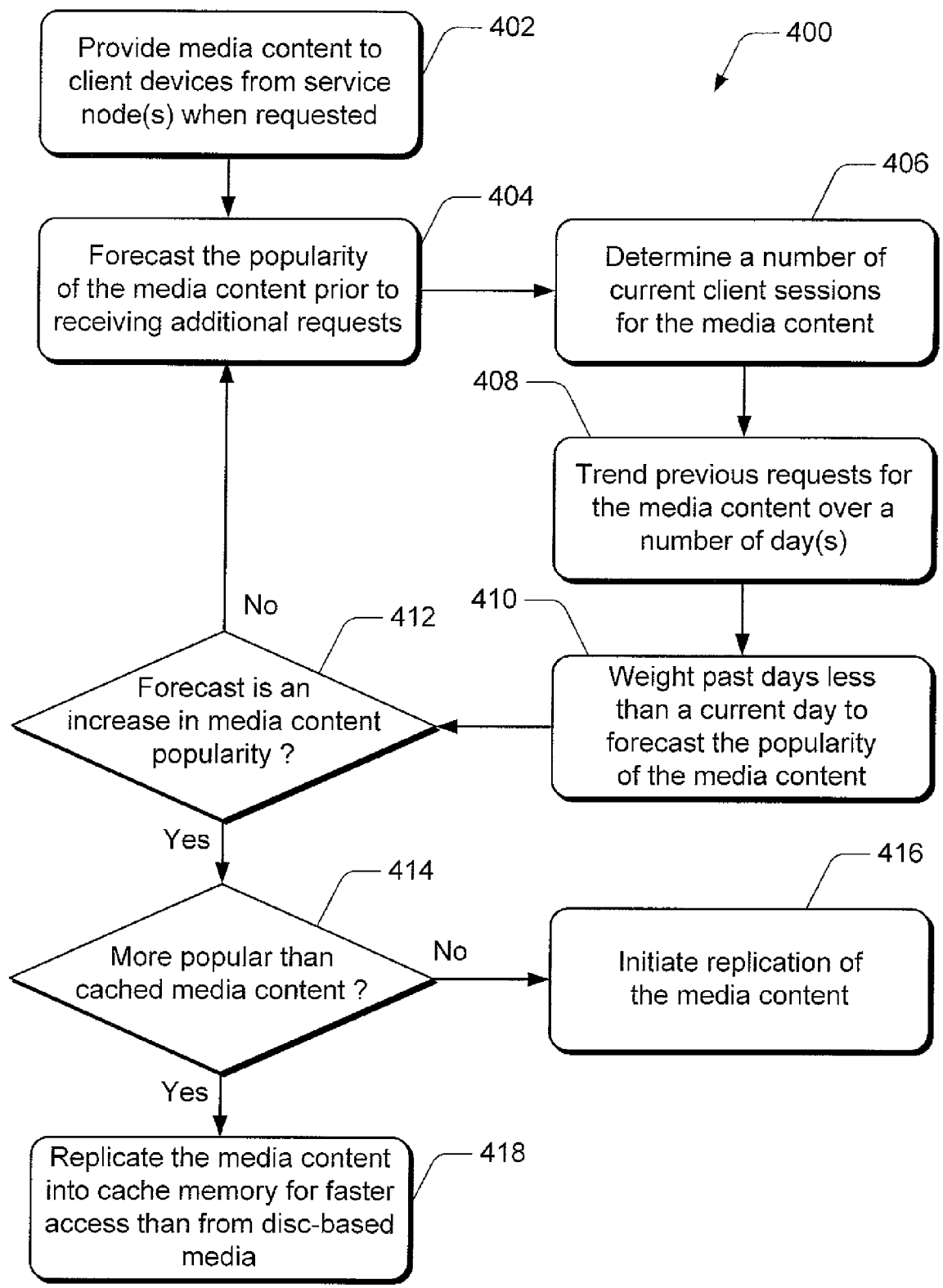
FIG. 4 illustrates example method(s) for predictive popular content replication.

FIG. 4 illustrates an example method 400 for adaptive content load balancing and is described with reference to the example media content systems shown in FIGS. 1 and 2. The order in which the method is described is not intended to be construed as a limitation, and any number of the described method blocks can be combined in any order to implement the method, or an alternate method.

At block 402, media content is provided to client devices from one or more service nodes when requested. For example, the service node(s) 110 provide recorded media content 116 and/or popular recorded media content 118 when the control node 102 receives the client session requests 108 for the media content.

At block 404, the popularity of the requested media content is forecast prior to receiving additional requests for the media content. Forecasting the popularity of the requested media content includes determining a number of current client sessions for the media content at block 406; trending previous requests for the media content over a number of day(s) at block 408; and weighting past days less than a current day to forecast the popularity of the media content at block 410. The popularity of the media content is forecast to determine a popularity increase in the media content or a popularity decrease in the media content. The previous requests for the media content can be trended over more than one day at a same time period of each day, and can be based on a category of the media content and the time period of the day when the additional requests for the media content are forecast to be received.

At block 412, a determination is made as to whether the media content is forecast to increase in popularity. If the forecast indicates a decrease in popularity of the media content (i.e., "no" from block 412), then the method 400 continues at block 404 to forecast the popularity of additional media content. If the forecast indicates an increase in popularity of the media content (i.e., "yes" from block 412), then a determination is made at block 414 as to whether the media content is forecast to be more popular than the least popular media content maintained in cache memory.

If the media content is not more popular than the least popular media content already maintained in the cache memory (i.e., "no" from block 414), then replication of the media content is initiated across one or more service nodes at block 416 such that the media content can be rapidly accessed to serve the additional requests for the media content. For example, media content that is forecast to increase in popularity can be replicated in the service node(s) 110 as recorded media content 116 maintained with disk-based recording media 112. The replications of the media content can be initiated by increasing the number of client sessions in the database 124 to trigger the load balancing manager 126 replicating the media content. The replication of the media content can be initiated before the same time period of each day when the additional requests for the media content are forecast to be received. From block 416, the method 400 can continue at block 404 to forecast the popularity of additional media content.

If the media content is more popular than the least popular media content already maintained in the cache memory (i.e., "yes" from block 414), then the media content is replicated into cache memory at block 418 such that the media content can be accessed faster than from disk-based media to serve the additional requests for the media content. For example, the media content is replicated into the cache memory 114 as the popular recorded media content 118 in an event that the media content is forecast to be more popular than the least popular media content maintained in the cache memory. From block 418, the method 400 can continue at block 404 to forecast the popularity of additional media content.

Figure 5:
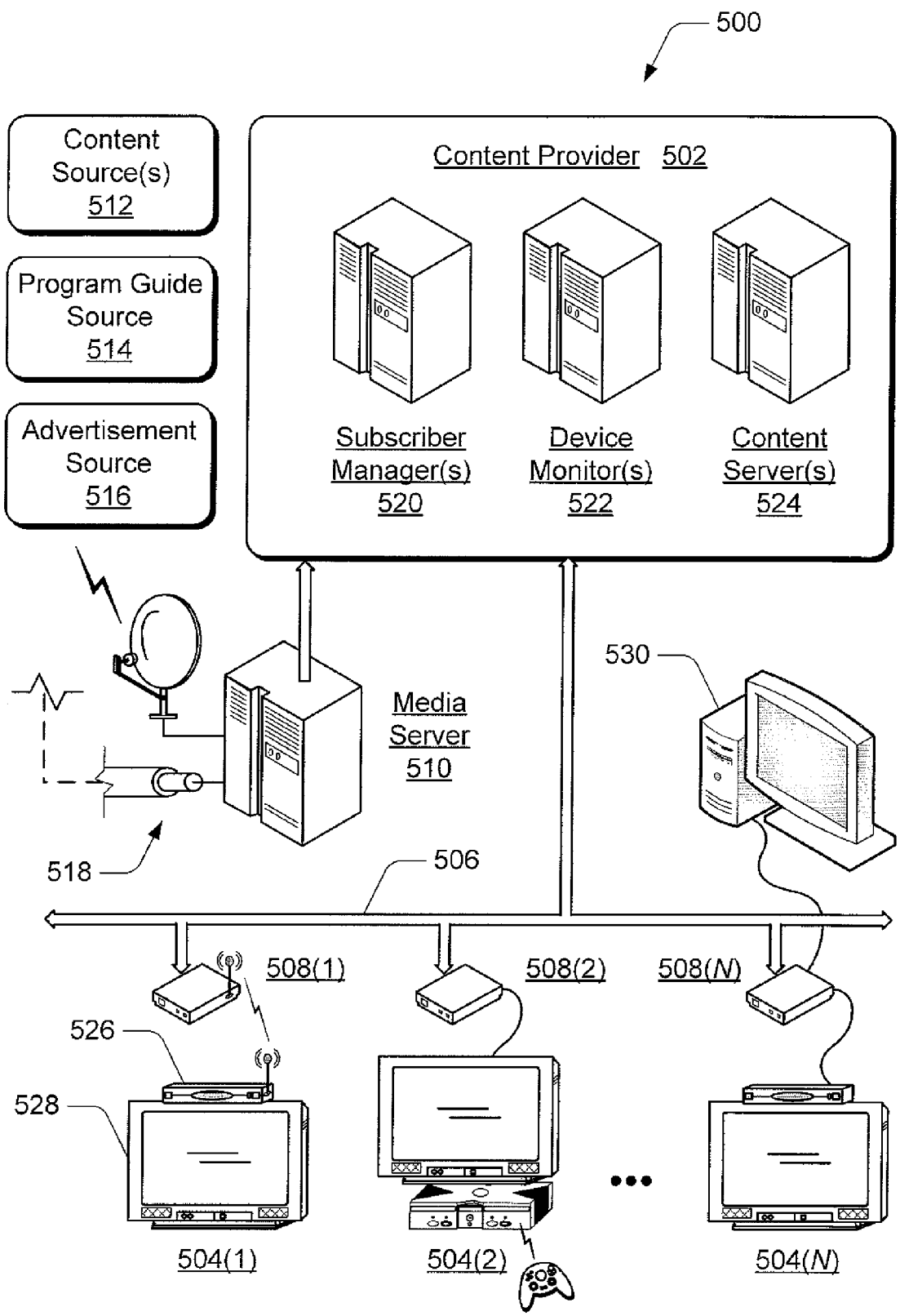
FIG. 5 illustrates various devices and components in an example entertainment and information system in which embodiments of adaptive content load balancing and predictive popular content replication can be implemented.

FIG. 5 illustrates an example entertainment and information system 500 in which an IP-based television environment can be implemented, and in which embodiments of adaptive content load balancing and embodiments of predictive popular content replication can be implemented. System 500 facilitates the distribution of media content, program guide data, and advertising content to multiple viewers and to multiple viewing systems. System 500 includes a content provider 502 and client systems 504(1-N) each configured for communication via a communication network 506. Each of the client systems 504(1-N) can receive one or more data streams of media content from content provider 502 which can then be distributed to one or more other client devices at DVR nodes of a multi-DVR system, such as in a home environment.

The network 506 can be implemented as any one or combination of a wide area network (e.g., the Internet), a local area network (LAN), an intranet, an IP-based network, a Digital Subscriber Line (DSL) network infrastructure, a point-to-point coupling infrastructure, a broadcast network, a public telephone network, a wireless network, or other media content distribution network. Additionally, network 506 can be implemented using any type of network topology and any network communication protocol, and can be represented or otherwise implemented as a combination of two or more networks. A digital network can include various hardwired and/or wireless links 508(1-N), routers, gateways, and so on to facilitate communication between content provider 502 and the client systems 504(1-N). The client systems 504(1-N) receive media content, program content, program guide data, advertising content, closed captions data, and the like from content server(s) of the content provider 502 via the IP-based network 506.

System 500 includes a media server 510 that receives media content from content source(s) 512, program guide data from a program guide source 514, and advertising content from an advertisement source 516. In an embodiment, the media server 510 represents an acquisition server that receives the audio and video media content from content source(s) 512, an EPG server that receives the program guide data from program guide source 514, and/or an advertising management server that receives the advertising content from the advertisement source 516.

The content source(s) 512, the program guide source 514, and the advertisement source 516 control distribution of the media content, the program guide data, and the advertising content to the media server 510 and/or to other television-based servers. The media content, program guide data, and advertising content is distributed via various transmission media 518, such as satellite transmission, radio frequency transmission, cable transmission, and/or via any number of other wired or wireless transmission media. In this example, media server 510 is shown as an independent component of system 500 that communicates the program content, program guide data, and advertising content to content provider 502. In an alternate implementation, media server 510 can be implemented as a component of content provider 502.

Content provider 502 is representative of a headend service in a media content distribution system, for example, that provides the media content, program guide data, and advertising content to multiple subscribers (e.g., the client systems 504(1-N)). The content provider 502 can be implemented as a satellite operator, a network television operator, a cable operator, and the like to control distribution of media content, program and advertising content, such as movies, television programs, commercials, music, and other audio, video, and/or image content to the client systems 504(1-N).

Content provider 502 includes various components to facilitate media data processing and content distribution, such as a subscriber manager 520, a device monitor 522, and a content server 524. The subscriber manager 520 manages subscriber data, and the device monitor 522 monitors the client systems 504(1-N) (e.g., and the subscribers), and maintains monitored client state information.

Although the various managers, servers, and monitors of content provider 502 (to include the media server 510 in one embodiment) are illustrated and described as distributed, independent components of content provider 502, any one or more of the managers, servers, and monitors can be implemented together as a multi-functional component of content provider 502. Additionally, any one or more of the managers, servers, and monitors described with reference to system 500 can implement features and embodiments of adaptive content load balancing and/or predictive popular content replication.

The client systems 504(1-N) can be implemented to include a client device 526 (e.g., a television-based client device) and a display device 528 such as any type of television, monitor, LCD, or similar display system that renders audio, video, and/or image data. A client device 526 of a client system 504 can be implemented in any number of embodiments, such as a set-top box, a digital video recorder (DVR) and playback system, an appliance device, a gaming system, and as any other type of client device that may be implemented in an entertainment and information system. In an alternate embodiment, client system 504(N) is implemented with a computing device 530 as well as a client device 526. A client device 526 of a client system 504 may also be associated with a user (i.e., a person) and/or an entity that operates a client device such that the client devices describe logical clients that include users, software, and/or devices.

Although embodiments of adaptive content load balancing/predictive popular content replication have been described in language specific to features and/or methods, it is to be understood that the subject of the appended claims is not necessarily limited to the specific features or methods described. Rather, the specific features and methods are disclosed as example implementations of adaptive content load balancing/predictive popular content replication.

The invention claimed is:

1. An adaptive content load balancing system, comprising:
   one or more processors configured to process computer-executable instructions stored on computer-readable media;
   a mapping service stored on the computer-readable media and executable by the one or more processors to:
      receive client requests for media content;
      determine one or more service nodes that can provide requested media content to a client;
      register each client request to correlate client sessions with requested media content provided from a service node;
   a controller service configured to:
      determine whether to replicate the requested media content for each received client request to optimize session capacity over the one or more service nodes;
      forecast a popularity of popular media content to determine for different media content categories at different time periods of a day the popular media content that is likely to be requested based at least in part on a category of the popular media content, the popularity being forecast based on a number of current client sessions for the popular media content, trends of previous requests for the popular media content over a number of days, and requests for the popular media content on past days being weighted less than requests for the popular media content on a current day; and
      trigger a load balancing manager to initiate the replication of the popular media content by increasing the number of client sessions stored in a database before client requests for the popular media content are received and before the different time periods of the day when the popular media content is likely to be requested.

2. An adaptive content load balancing system as recited in claim 1, wherein the controller service is further configured to initiate replication of the requested media content such that a client session can be established to provide the requested media content to a client.

3. An adaptive content load balancing system as recited in claim 1, wherein the controller service is further configured to direct an additional service node to replicate the requested media content such that a client session can be established to provide the requested media content to a client from the additional service node.

4. An adaptive content load balancing system as recited in claim 1, wherein the controller service is further configured to balance the client sessions correlated with the requested media content to optimize the session capacity over the one or more service nodes.

5. An adaptive content load balancing system as recited in claim 1, wherein the controller service is further configured to determine whether to replicate the requested media content based on a capacity threshold of the one or more service nodes.

6. An adaptive content load balancing system as recited in claim 1, wherein the controller service is further configured to initiate replication of the requested media content when the requested media content is the media content provided for fewer client sessions than additional media content provided for the most client sessions.

7. An adaptive content load balancing system as recited in claim 1, further comprising a content server that includes the one or more service nodes.

8. An adaptive content load balancing system as recited in claim 1, wherein the database correlates the client sessions each with the service node from which the requested media content is provided.

9. An adaptive content load balancing system as recited in claim 1, further comprising an on demand content delivery system configured to provide the requested media content to a client.

10. A method, comprising:
receiving client requests for media content;
determining one or more service nodes that can provide requested media content to a client;
registering each client request to correlate client sessions with requested media content provided from a service node;
determining whether to replicate the requested media content for each received client request to optimize session capacity over the one or more service nodes;
forecasting a popularity of popular media content to determine at different time periods of a day the popular media content that is likely to be requested based at least in part on a category of the popular media content, wherein forecasting includes determining a number of current client sessions for the popular media content, trending previous requests for the popular media content over a number of days, and weighting requests for the popular media content on past days less than requests for the popular media content on a current day; and
initiating the replication of the popular media content by increasing the number of client sessions stored in a database before client requests for the popular media content are received and before the different time periods of the day when the popular media content is likely to be requested.

11. A method as recited in claim 10, further comprising initiating replication of the requested media content such that a client session can be established to provide the requested media content to a client.

12. A method as recited in claim 10, further comprising directing an additional service node to replicate the requested media content such that a client session can be established to provide the requested media content to a client from the additional service node.

13. A method as recited in claim 10, further comprising balancing the client sessions correlated with the requested media content to optimize the session capacity over the one or more service nodes.

14. A method as recited in claim 10, further comprising determining whether to replicate the requested media content based on a capacity threshold of the one or more service nodes.

15. A method as recited in claim 10, further comprising initiating replication of the requested media content when the requested media content is the media content provided for fewer client sessions than additional media content provided for the most client sessions.

16. One or more computer readable storage media comprising computer executable instructions that, when executed, direct a control system to:
determine one or more service nodes that can provide requested media content to a client;
register each client request to correlate client sessions with requested media content provided from a service node;
determine whether to replicate the requested media content for each received client request to optimize session capacity over the one or more service nodes;
forecast a popularity of popular media content to determine at different time periods of a day the popular media content that is likely to be requested based at least in part on a category of the popular media content, the popularity being forecast based on a number of current client sessions for the popular media content, trends of previous requests for the popular media content over a number of days, and requests for the popular media content on past days being weighted less than requests for the popular media content on a current day;
initiate the replication of the popular media content by increasing the number of client sessions stored in a database before client requests for the popular media content are received and before the different time periods of the day when the popular media content is likely to be requested.

17. One or more computer storage media as recited in claim 16, further comprising computer executable instructions that, when executed, direct the control system to initiate replication of the requested media content such that a client session can be established to provide the requested media content to a client.

18. One or more computer storage media as recited in claim 16, further comprising computer executable instructions that, when executed, direct the control system to balance the client sessions correlated with the requested media content to optimize the session capacity over the one or more service nodes.

19. One or more computer storage media as recited in claim 16, further comprising computer executable instructions that, when executed, direct the control system to direct an additional service node to replicate the requested media content such that a client session can be established to provide the requested media content to a client from the additional service node.

20. One or more computer storage media as recited in claim 16, further comprising computer executable instructions that, when executed, direct the control system to determine whether to replicate the requested media content based on a capacity threshold of the one or more service nodes.

* * * * *